United States Patent [19]

Ashida et al.

[11] Patent Number: 5,290,857
[45] Date of Patent: Mar. 1, 1994

[54] EPOXY RESIN ADHESIVE COMPOSITION

[75] Inventors: Tadashi Ashida, Yokohama; Masahiko Ohnishi, Yokosuka; Toshio Nagase, Ibaragi; Akira Nakayama, Yokosuka, all of Japan

[73] Assignees: Nippon Zeon Co., Ltd., Tokyo; Nissan Motor Co., Ltd., Yokohama, both of Japan

[21] Appl. No.: 939,912

[22] Filed: Sep. 3, 1992

[30] Foreign Application Priority Data

| Sep. 4, 1991 [JP] | Japan | 3-253029 |
| Jan. 31, 1992 [JP] | Japan | 4-042301 |
| Aug. 7, 1992 [JP] | Japan | 4-232808 |

[51] Int. Cl.$^5$ .............. C08L 63/00; C08L 51/04; C09J 163/00; C08G 59/18
[52] U.S. Cl. ............................. 525/65; 525/902
[58] Field of Search .............................. 525/65, 902

[56] References Cited

U.S. PATENT DOCUMENTS

| 3,833,683 | 9/1974 | Dickie | 525/309 |
| 4,657,970 | 4/1987 | Shiraki | 525/65 |
| 4,668,736 | 5/1987 | Robins | 525/65 |
| 4,778,851 | 10/1988 | Henton | 525/902 |

FOREIGN PATENT DOCUMENTS

| 104888 | 5/1987 | Japan | 525/65 |

*Primary Examiner*—John C. Bleutge
*Assistant Examiner*—D. R. Wilson
*Attorney, Agent, or Firm*—Millen, White, Zelano & Branigan

[57] ABSTRACT

An epoxy resin adhesive composition has excellent adhesive properties such as impact resistance, tensile shear strength and T-peel strength as well as excellent semi-gelling property. An epoxy resin adhesive composition comprising ionic crosslinking in a polymer utilized as the impact resistance modifier has not only excellent semi-gelling property and mechanical properties of cured products but also excellent storage stability for a long time and it is advantageously utilized when the application occasionally requires storage or standing of the material for one month to one year at the room temperature. The epoxy resin adhesive composition comprises an epoxy resin, a powder core/shell polymer and a heat activation type hardener for epoxy resins. The powder core/shell polymer is composed of a core comprising an acrylate polymer or a methacrylate polymer having a glass transition temperature of $-30°$ C. or lower and a shell comprising an acrylate polymer or a methacrylate polymer comprising crosslinking monomer units having a glass transition temperature of 70° C. or higher and weight ratio of the core to the shell is in the range from 10/1 to 1/4.

10 Claims, No Drawings

EPOXY RESIN ADHESIVE COMPOSITION

BACKGROUND OF THE INVENTION

1. Field of the Invention

The present invention relates to a novel epoxy resin adhesive composition. More particularly, it relates to an epoxy resin adhesive composition comprising a powder core/shell polymer in which the core and the shell comprise an acrylate polymer or a methacrylate polymer and having excellent impact resistance and semi-gelling property simultaneously.

2. Description of the Prior Art

Epoxy resins have various excellent properties and have been widely utilized in various applications such as adhesives, adhesive films, bulk resins, resins for casting, resins for powder molding, coating materials, sealing materials for electronic circuits, base materials for various composites and the like other applications.

However, epoxy resins have a problem that impact resistance is insufficient and naturally various improvements have been made to solve the problem. The methods of improving the impact resistance of epoxy resins can be divided into two major kinds, which are improvement by modifying chemical structure of the epoxy resin itself and improvement by addition of an impact resistance modifier prepared separately to the epoxy resin. Methods of the former kind alone cannot provide an epoxy resin having satisfactory impact resistance.

As methods of the latter kind, the following methods have been known: (1) addition of a soluble elastomer monomer to the epoxy resin before curing, followed by polymerization of both components; (2) addition of a compatible elastomer polymer to the epoxy resin before curing; and (3) dispersion of fine particles of an impact resistance modifier polymer in the epoxy resin before curing. As an example of the method (1), a method of forming rubber domains of 0.1 to 0.2 $\mu$m in an epoxy resin by forming SIPN (Simultaneous interpenetrating networks) of n-butyl acrylate in the resin was reported (Journal of Polymer Science, Symposium, volume 46, pages 175~190 (1974). This method has the problems that softening point of the resin is generally decreased and that consistent mechanical strength cannot be obtained. As the method (2), various methods have been known about rubber modification of the resin by addition of an elastomer component such as butadiene acrylonitrile copolymer rubber having a carboxyl group and an amino group as the terminal groups of the molecule. Some of these methods have been practically applied but the adhesives prepared by these methods do not have satisfactory impact resistance or toughness for use as a structural adhesive. As the method (3), various kinds of impact resistance modifier have been proposed but none of them have sufficient semi-gelling property.

It is generally known that addition of a rubber component having a glass transition temperature of $-30°$ C. or lower as an impact resistance modifier of a plastic improves the impact resistance of the plastic remarkably by absorption of external stress by the modifier. However, when many of the rubber components of this kind are mixed with a matrix of an epoxy resin in a liquid state, the dispersion tends to be affected by the conditions of mixing and viscosity of the composition prepared is unstable during storage. Thus, this kind of material is not practical for use as an adhesive for automobiles to which storage stability for a long time is required.

Semi-gelling property is another important property for epoxy resin adhesives. It is known that a core/shell type modifier comprising (meth)acrylate polymer is effective for providing an epoxy resin composition with the semi-gelling property (Japanese Laid Open Patent Application Heisei 2-80483). The semi-gelling property is the property whereby an adhesive in a liquid form or a paste form solidifies to a non-adhesive or adhesive solid form by heating at a temperature lower than the heat curing temperature and, in this form, the adhesive is still in a fragile condition because the epoxy resin component is not hardened yet. The semi-gelling property has the following advantage. In the automobile industry, a metal substrate is sometimes subject to workings such as folding, cutting, degreasing and acid treatment after it has been applied with a heat curing adhesive composition based on an epoxy resin. During the workings, problems are likely to arise that adhesives may be separated from the substrate or scattered, that excess adhesive material sticking out of the part of adhesion must be removed to deteriorate the working environment and that a pretreatment solution of coating is contaminated by elution of the adhesive material. The semi-gelling of the adhesive composition by heating for a short time after application of the adhesive composition on the substrate makes removal of the excess adhesive material from the substrate easier and the problem of the contamination of the pretreatment solution of coating can be solved at the same time.

SUMMARY OF THE INVENTION

The present invention accordingly has an object to provide an epoxy resin adhesive composition having excellent adhesive properties, such as impact strength and tensile and shear strengths, and semi-gelling property simultaneously.

Extensive investigations undertaken by the present inventors to develop the epoxy resin adhesive composition having the desirable properties described above led to a discovery that the object can be achieved by the composition comprising an epoxy resin, a specific amount of an impact resistance modifier of the powder core/shell polymer comprising a specific kind of acrylate polymer or a methacylate polymer and a heat activation type hardener for epoxy resins. The present invention has been completed on the basis of the discovery.

The epoxy resin adhesive composition of the present invention comprises (A) and epoxy resin, (B) a powder core/shell polymer comprising particles having the structure composed of a core comprising an acrylate polymer or a methacrylate polymer having a glass transition temperature of $-30°$ C. or lower and a shell comprising an acrylate polymer or a methacrylate polymer having a glass transition temperature of $70°$ C. or higher and (C) a heat activation type hardener for epoxy resins, the shell being made by graft copolymerization of an acrylate monomer or a methacrylate monomer and 0.01 to 5 weight % of a crosslinking monomer based on the total amount of the monomer constituting the shell to the core, the weight ratio of the core to the shell being in the range from 10/1 to 1/4 and the weight average diameter of the core comprising a single particle or an aggregate of the particles being in the range from 0.1 to 3.0 $\mu$m.

DETAILED DESCRIPTION OF THE INVENTION

The invention is explained in detail in the following.

Examples of the epoxy resins utilized as the component (A) in the invention are epoxy resins derived from the following compounds: glycidyl ethers, such as glycidyl ethers of bisphenol A, bisphenol F, resorcinol, hydrogenated bisphenol A and the like, polyglycidyl ethers of phenol novolak resins, cresol novolak resin and the like and the like other polyglycidyl ethers; glycidyl esters, such as glycidyl esters of phthalic acid, hexahydrophthalic acid, tetrahydrophthalic acid and the like, and the like other glycidyl esters; glycidyl amines; linear aliphatic epoxides; hydantoin derivatives; dimer acid derivatives, epoxy modified NBR and the like.

Preferable examples of the component (A) among the above compounds are epoxy resins derived from bisphenol A.

Examples of the epoxy resin derived from bisphenol A are compounds having the formula:

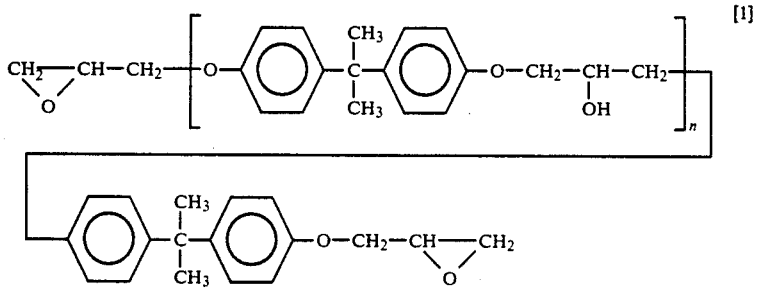

wherein n takes a value larger than 0. Compounds having average value of n less than 1 are liquid at the room temperature and more preferably utilized.

Other examples of the epoxy resin derived from bisphenol A are epoxy resins derived from a compound prepared by adding 2 to 20 mol of ethylene oxide to one mol of bisphenol A, epoxy resins derived from a compound prepared by adding 2 to 20 mol of propylene oxide to one mol of bisphenol A and epoxy resins derived from mixtures of these compounds. In these examples of the component (A), preferable number of addition of ethylene oxide or propylene oxide to bisphenol A is in the range from 2 to 20 mol per one mol of bisphenol A.

The epoxy resins derived from the compounds having added ethylene oxide or propylene oxide can be prepared by various methods. For example, the epoxy resins having various molecular weights can be prepared by the reaction of epichlorohydrin with an addition product of 2 to 20 mol of ethylene oxide or propylene oxide to hydroxyl groups of 1 mol of bisphenol A in a specified ratio.

Among the epoxy resins derived from the compounds having added ethylene oxide or propylene oxide, the epoxy resins prepared by utilizing ethylene oxide are preferable to the epoxy resins prepared by utilizing propylene oxide because of higher adhesive strength.

The epoxy resin may be utilized singly or as a combination of two or more kinds. When an epoxy resin selected from the preferable examples described above is utilized in combination with other epoxy resins, the amount of the epoxy resin selected from the preferable examples is in the range from 5 to 100 weight %, preferably in the range from 10 to 70 weight %, based on the total amount of the epoxy resin component (A) in the composition.

In the composition of the invention, the powder core/shell polymer component (B) is utilized as the modifier for improving impact resistance. This powder core/shell polymer comprises particles having the structure composed of a core comprising an acrylate polymer or a methacrylate polymer having a glass transition temperature of $-30°$ C. or lower and a shell comprising an acrylate polymer or a methacrylate polymer comprising crosslinking monomer units and having a glass transition temperature of 70° C. or higher. The weight ratio of the core to the shell in the structure is in the range from 10/1 to ¼. The weight average diameter of the core comprising a single particle or an aggregate of the particles is in the range from 0.1 to 3.0 μm.

In the powder core/shell polymer, it is preferable that the shell has an average thickness of 50 Å or more. When the shell is formed by polymerization, it is preferable that a crosslinking monomer is added for copolymerization or that, in addition to the crosslinking monomer, a radical polymerizable unsaturated carboxylic acid monomer having 3 to 8 carbon atoms and a carboxyl group is added for copolymerization.

It is preferable in the latter case that the powder core/shell polymer comprises polymer particles which are ion-crosslinked by addition of a monovalent or divalent metal cation.

The powder core/shell polymer can be prepared by multistage seed emulsion polymerization having at least two consecutive stages or by forming a shell by graft polymerization on a core which is formed by partial coagulation of seed latex prepared in the first stage by the method of solvent coagulation or the like.

A typical example of the preparation of the powder core/shell polymer is explained in the following.

In the first stage of the polymerization, an acrylate monomer or a methacrylate monomer having an alkyl group of 2 to 8 carbon atoms is polymerized to prepare a rubbery seed polymer having a glass transition temperature of $-30°$ C. or lower, preferably in the range from $-40°$ to $-70°$ C. It is preferable that the acrylate monomer or the methacrylate monomer is copolymerized with a crosslinking monomer. Examples of the acrylate monomer and the methacrylate monomer having an alkyl group of 2 to 8 carbon atoms are ethyl acrylate, propyl acrylate, n-butyl acrylate, cyclohexyl acrylate, 2-ethylhexyl acrylate, ethyl methacrylate, butyl methacrylate and the like. The more preferable example among them is n-butyl acrylate. The acrylate monomer or the methacrylate monomer described above may be utilized singly or as a combination of two or more kinds.

To the acrylate monomer or the methacrylate monomer described above, a crosslinking monomer may be added to enhance elastic property of the product according to necessity. The crosslinking monomer is a monomer having two or more double bonds of substantially the same reactivity in the molecule. Examples of the crosslinking monomer are: ethylene glycol diacrylate, ethyleneglycol dimethacrylate, butylene glycol diacrylate, butyleneglycol dimethacrylate, trimethylolpropane diacrylate, trimethylolpropane dimethacrylate, trimethylolpropane triacrylate, trimethylolpropane trimethacrylate, hexanediol diacrylate, hexanediol dimethacrylate, oligoethylene diacrylate, oligoethylene dimethacrylate, aromatic divinyl monomers such as divinylbenzene and the like, triallyl trimellitate, triallyl isocyanurate and the like. The crosslinking monomer may be utilized singly or as a combination of two or more kinds. The amount of the crosslinking monomer is generally in the range from 0.01 to 5 weight %, preferably in the range from 0.1 to 2 weight %, based on the total amount of the monomers.

Other copolymerizable monomers may be utilized together with the acrylate monomer or the methacrylate monomer and the crosslinking monomer according to necessity. Examples of the other copolymerizable monomer are: aromatic vinyl compounds such as styrene, vinyltoluene, α-methylstyrene and the like, cyanovinyl compounds such as acrylonitrile, methacrylonitrile and the like, vinylidene cyanide, 2-hydroxyethyl acrylate, 2-hydroxyethyl methacrylate, 3-hydroxybutyl acrylate, 2-hydroxyethyl fumarate, hydroxybutyl vinyl ether, monobutyl maleate, glycidyl methacrylate, butoxyethyl methacrylate and the like. The other copolymerizable monomer may be utilized singly or as a combination of two or more kinds. The amount of the other copolymerizable monomer is generally 50% or less based on the total amount of the monomers.

The polymer particle thus prepared from the acrylate monomer or the methacrylate monomer serves as the core and the emulsion polymerization as the second stage of the preparation of the powder core/shell polymer is made to form the shell by graft copolymerization using an acrylate monomer or a methacrylate monomer, a crosslinking monomer utilized according to necessity and a radical polymerizable unsaturated carboxylic acid monomer also utilized according to necessity. The acrylate monomer utilized herein is an acrylate monomer having an alkyl group of 1 to 4 carbon atoms and the methacrylate monomer utilized herein is an methacrylate monomer having an alkyl group of 1 to 4 carbon atoms. Examples of the acrylate monomer and the methacrylate monomer are ethyl acrylate, n-butyl acrylate, methyl methacrylate, butyl methacrylate and the like. The acrylate monomer and the methacrylate monomer may be utilized singly or as a combination of two or more kinds. The preferable example among these compounds is methyl methacrylate.

As the crosslinking monomer, one or more kinds of the crosslinking monomer may selected from the crosslinking monomers utilized in the formation of the core described above. The preferable example of the crosslinking monomer herein is triallyl trimellitate. The amount of the crosslinking monomer is in the range from 0.01 to 5 weight %, preferably in the range from 0.1 to 5 weight % based on the total weight of the monomers forming the shell. When the amount is less than 0.01 weight %, the effect of improvement by the crosslinking monomer, such as increase of the stability of viscosity during storage and increase of mechanical strengths of the cured products, is barely obtained and, when the amount is more than 5 weight %, mechanical strengths of the cured products are decreased.

Other copolymerizable monomers may be utilized together with the acrylate monomer or the methacrylate monomer and the crosslinking monomer according to necessity. As the other copolymerizable monomer, one or more kinds of monomer may be selected from the other copolymerizable monomer utilized in the formation of the core described above. The amount of the other copolymerizable monomer is generally 50 weight % or less based on the total weight of the monomers used.

Examples of the radical polymerizable unsaturated carboxylic acid monomer having 3 to 8 carbon atoms and a carboxyl group are: unsaturated monocarboxylic acids, such as acrylic acid, methacrylic acid, ethacrylic acid, crotonic acid, cinnamic acid and the like; unsaturated dicarboxylic acids, such as maleic acid, itaconic acid, fumaric acid, citraconic acid, chloromaleic acid and the like; anhydrides of the unsaturated dicarboxylic acids; monoesters of unsaturated dicarboxylic acids, such as monomethyl maleate, monoethyl maleate, monobutyl maleate, monomethyl fumarate, monoethyl fumarate, monomethyl itaconate, monoethyl itaconate, monobutyl itaconate and the like; their derivatives and the other like monomers.

The radical polymerizable unsaturated carboxylic acid monomer may be utilized singly or as a combination of two or more kinds. Preferable examples among these compounds are acrylic acid, methacrylic acid, maleic acid, maleic anhydride and fumaric acid.

It is preferable that the copolymer comprising carboxyl groups is comprised at least in the shell of the particle of the powder core/shell polymer and one molecule of the copolymer comprises one or more monomer units comprising the carboxyl group in average. The amount of the monomer unit having the carboxyl group is in the range from 0.01 to 20 weight parts, preferably in the range from 0.05 to 10 weight parts and more preferably in the range from 0.1 to 5 weight parts, based on 100 weight parts of the copolymer. When the content of the monomer unit comprising the carboxyl group is less than 0.01 weight parts, the effect of improvement of surface by the ionic crosslinking is barely exhibited and, when the content is more than 20 weight parts, the effect of improvement of surface by the ionic crosslinking is not increased to the degree as expected from the amount utilized but the proper mechanical properties of the base resin are deteriorated. Thus, amounts outside of the specified range are not advantageous.

In the particle of the powder core/shell polymer, the whole part of the shell may be made of the copolymer comprising carboxyl groups or an outer layer of the shell alone may be made of the copolymer comprising carboxyl groups. The particle having the copolymer comprising carboxyl group only in the outer layer of the shell can be prepared by addition of the monomer comprising the carboxyl group at the later stage of the polymerization continuously or intermittently. When the copolymer comprising carboxyl groups is comprised only in the outer layer of the shell, the content of the monomer unit comprising the carboxyl group in the whole resin particle can be reduced while the proper physical properties of the base resin is retained.

The resin particle having the copolymer comprising carboxyl groups in the shell alone can be prepared, for example, by the so-called core/shell emulsion polymerization. In this method, a latex of polymer fine particles which is to form the core is first prepared by emulsion polymerization of a mixture of the required monomers excluding the monomer comprising the carboxyl group. Then, a mixture of the required monomers including the monomer comprising the carboxyl group is added to the polymerized mixture and the polymerization is continued to form the shell made of the copolymer comprising carboxyl groups on the surface of the polymer fine particle forming the core. Main monomers utilized for the copolymer in the shell may be of different kinds from the monomers utilized for the polymer in the core according to necessity. The monomer comprising the carboxyl group may be added to the reactor either simultaneously with the monomers forming the major part of the polymer, separately at the later stage of the polymerization of the monomers forming the major part of the polymer or intermittently during the polymerization of the monomers forming the major part of the polymer. These methods can be suitably adopted according to the characteristic reactivity ratios of the monomers which are determined by the combination of the monomers.

The glass transition temperature of the acrylate polymer or the methacrylate polymer forming the shell is 70° C. or higher and preferably in the range from 80° to 120° C. When the glass transition temperature is lower than 70° C., the adhesive composition prepared by mixing the polymer particles with the epoxy resin has insufficient storage stability. Particularly when the glass transition temperature is lower than 40° C., the composition has too high viscosity and problems like clogging of nozzle during spray drying are caused.

The powder core/shell polymer showing excellent dispersion in the epoxy resin can be obtained generally by direct spray drying of the latex containing the core/shell polymer prepared by the multistage emulsion polymerization. Though the powder core/shell polymer is generally prepared by the multistage seed emulsion polymerization comprising at least two stages as described above, it may be prepared otherwise by partial coagulation of the seed latex prepared in the first stage and then by graft polymerizing the monomers on the core thus prepared. It may also be prepared through the processes in which the latex particles prepared by the emulsion polymerization are separated by coagulation with a method like salting out and freezing and the wet cake prepared by dewatering of the coagulate is dried with a fluidized bed and the like to obtain coagulated particles of the polymer.

The weight ratio of the core to the shell of the powder core/shell polymer thus prepared is in the range from 10/1 to 1/4 and preferably in the range from 8/1 to 1/3. When the ratio is higher than 10/1, adhesive strengths of various kinds are decreased, the storage stability is deteriorated and the semi-gelling property is lost. When the ratio is lower than 1/4, adhesive strengths of various kinds, particularly T-peel strength, is decreased to a great degree even though the storage stability and the semi-gelling property are retained.

The core particle composed of a single particle or an aggregate of particles of the powder core/shell polymer has a weight average diameter preferably in the range from 0.1 to 3.0 μm and more preferably in the range from 0.15 to 2.0 μm. The core particle may be utilized for the polymerization of the shell components directly after the polymerization or for the polymerization to coat the core with the shell components after the core particle is coagulated by solvent coagulation or by salting out. Various methods have been known for the secondary coagulation of particles and any of such methods can be utilized.

When the weight average diameter of the particle is less than 0.1 μm, the dispersion tends to be inferior because the surface area is too large for the same weight and the mechanical strength and the storage stability of the epoxy resin adhesive composition comprising the powder core/shell polymer tend to be inferior. When the weight average diameter of the particle is larger than 3.0 μm, the adhesive strengths of various kinds, such as shear strength and peeling strength, tend to be decreased.

The average thickness of the shell in the powder core/shell polymer is preferably 50 Å or more and more preferably in the range from 50 to 5000 Å. When the thickness is less than 50 Å, the coverage of the particle with the shell component may be insufficient to cause the decrease of the storage stability.

The amount of the powder core/shell polymer component (B) in the adhesive composition is not particularly limited. The amount is generally in the range from 10 to 100 weight parts and preferably in the range from 10 to 50 weight parts based on 100 weight parts of the epoxy resin component (A). When the amount is less than 10 weight parts, the effect of improvement of the impact strength is not exhibited sufficiently. When the amount is more than 100 weight parts, viscosity of the composition is increased to a great degree to cause problems on processing.

In the epoxy resin adhesive composition of the invention, it is preferably that a monovalent metal cation or a divalent metal cation is added to the powder core/shell polymer having the shell comprising carboxyl groups and the polymer is ion-crosslinked with the cation. Examples of the monovalent metal cation and the divalent metal cation are monovalent cations, such as ions of potassium, sodium, lithium, cesium and the like, and divalent cations, such as ions of calcium, zinc, tin, chromium, lead and the like. Preferably examples are ions of metals of the group I to III of the Periodic Table. Examples of the source of the cations are inorganic compounds of the monovalent metals and the divalent metals, such as oxides, hydroxides, phosphates, carbonates, nitrates, sulfates, chlorides, nitrites, sulfites and the like; the monovalent or divalent metal salts of organic acids, such as octylates, stearates, oleates, caprates, formates, succinates, erucates, linoleates, palmitates, propionates, acetates, adipates, lactates, naphthates, thiocarboxylates and the like; and other compounds of the monovalent metals and the divalent metals, such as acetylacetone salts, alcoholates like ethoxides, methoxides and the like; and the like other compounds. When the source of the metal cation is salts of hydrochloric acid, it is preferable that the dissociation constant pKa of the acid is 4 or more. Among these examples of the source of the cation, hydroxides and carboxylates of the monovalent metals are effective with respect to the reaction efficiency and the mechanical strength of the heat cured products.

The sources of the monovalent cations and the divalent cations described above do not require heating of a long time unlike sources of multivalent cations having valency of three or more and the crosslinking reaction proceeds at the room temperature within several minutes in a solution.

When the monomer comprising the carboxyl group is copolymerized in an aqueous medium, most of the carboxyl groups are concentrated at the surface of the particle because of the hydrophilic nature of the monomer. When the cation source is added to the aqueous part, the probability of the encounter of the cation with the carboxyl group having a high degree of dissociation is quite high because the reaction of interest is an ionic reaction. Thus, the crosslinking reaction is completed in a short time.

Since the above crosslinking reaction takes place at the surface of the shell, the copolymer comprised in the resin constituting the core is not required to comprise the monomer comprising carboxyl group. However, this does not exclude using the monomer comprising the carboxyl group for the resin constituting the core.

The rate of the ionic crosslinking reaction of the resin particle does not depend on temperature much. The amount of metal ion contained in the copolymer after the ionic crosslinking is kept the same in the temperature range from 0° to 50° C., showing that temperature control of the ionic crosslinking is not required and that a consistent crosslinking is easily realized.

In the ionic crosslinking described above, a part or whole of the carboxyl groups are ionized and ionic linkages are formed by taking the monovalent or divalent metal cation as the counter cation. Hence, the degree of the ionic crosslinking can be easily adjusted by the amount of the cation source. The ionic crosslinking reaction proceeds generally quantitatively. However, the amount of the cation source may exceed the theoretically equivalent amount. The ionic crosslinking can be easily analyzed by measuring absorption of the carboxylate group by the infrared spectroscopy, by determination of the metal ion or by measuring the degree of swelling in solvents. Dissociation of the ionic crosslinking can be measured by the differential thermal analysis and density of crosslinking can be measured by the degree of swelling.

For preparing the ion-crosslinked polymer efficiently, mol ratio of the metal atom in the cation source to the carboxyl group comprised in the copolymer must be suitably selected according to the desired degree of crosslinking. The mol ratio of the cation source to the carboxyl group in the copolymer is preferably in the range from 0.1 to 3 to obtain ion-crosslinked polymer having excellent mechanical strength. When the mol ratio is less than 0.1, the effect of improvement of the surface is inferior to a great degree and, when the mol ratio is more than 3, mechanical properties tend to be deteriorated, thus a ratio outside of the specified range is undesirable. The semi-gelling property described above is not affected by the introduction of the ion-crosslinked structure.

The ion-crosslinked polymer can be prepared, for example, (1) by the method of making ionic crosslinking reaction by adding a cation source or a solution thereof to a polymer solution prepared by dissolving the polymer in an appropriate solvent; (2) by the method of adding a cation source or a solution thereof to the latex after the polymerization process; and (3) by the method of adding a cation source during the preparation process of the adhesive composition in which the powder of the copolymer is mixed to the unreacted epoxy resin.

Any of these methods may be utilized as the method of preparation of the ion-crosslinked polymer of the invention and, among them, the method of adding a cation source to latex is simple and advantageous with respect to the processability and dispersion efficiency.

The ion-crosslinked structure of the component (B) is different from the structures of sulfur crosslinking and peroxide crosslinking and the formation of the crosslinking is reversible. While the surface of the resin particle modified by the ionic crosslinking shows the crosslinked structure at the room temperature, it shows the structure of dissociated crosslinking at the temperature of molding under heating for curing. This change of the structure further enhances the advantage of the present composition such that the stability of viscosity during the storage and the mechanical strength of cured products are achieved simultaneously.

The cation as the crosslinking agent forms an ionic crosslink between the carboxyl groups present as the side groups in the copolymer forming the shell of the resin particle. The three dimensional polymer structure thus formed in the shell of the resin particle suppresses the swelling of the polymer by the epoxy medium at the room temperature and the storage stability of the composition is improved while the product after the heat curing of the composition comprising the base polymer and the dispersion medium retains the proper physical properties.

This feature of the invention is an application of the properties of the ion-crosslinked polymer to the technical field of storage stabilization of resin dispersions. The principle of the invention is widely effective for the technology of resin dispersion and applicable to all of the resin particles for adhesive applications irrespective of the kind of the resin.

Though it is sufficient for suppressing swelling that the resin particle has the ion-crosslinked structure only in the polymer of the shell, the core of the resin particle may also have the ion-crosslinked structure depending on the required properties of the cured product according to necessity.

Examples of the heat activation type hardener component (C) utilized in the invention are: imidazole derivatives, such as dicyandiamide, 4,4'-diaminodiphenylsulfone, 2-n-heptadecylimidazole and the like, isophthalic acid dihydrazide, derivatives of N,N-dialkylurea, derivatives of N,N-dialkylthiourea, acid anhydrides such as tetrahydrophthalic anhydride, isophoronediamine, m-phenylenediamine, N-aminoethylpiperazine, melamine, guanamine, complexes of boron trifluoride, tris-dimethylaminomethylphenol and the like. The heat activation type hardener may be utilized singly or as a combination of two or more kinds. The preferable example among these compounds is dicyandiamide.

The amount of the heat activation type hardener component (C) is not particularly limited but generally in the range from 3 to 30 weight parts and preferably in the range from 5 to 20 weight parts based on 100 weight parts of the epoxy resin component (A). When the amount is less than 3 weight parts, curing is insufficient to cause decrease of the adhesive strengths of various kinds to a great degree. When the amount is more than 30 weight parts, excessive heat generated by the reaction during the molding causes partial decomposition and thermal degradation to result in decrease of the adhesive strengths of various kinds and discoloration to a great degree.

Additives of various kinds may be added to the composition of the invention for various purposes, such as adjustment of processing properties like workability and viscosity, increase of stability and decrease of cost, so long as the additives do not harm the object of the invention. Examples of such additives are diluents, stabilizers, emulsifiers, reinforcing agents, plasticizers, cure accelerators, fillers, pigments, thixotropic agents, fire retardants, antioxidants, ultraviolet absorbers, lubricants, mold release agents, surface active agents, blowing agents and the like other additives.

Examples of the cure accelerators are alcohol accelerators, phenol accelerators, mercaptan accelerators, dimethylurea accelerators, alicyclic accelerators, imidazole accelerators and the like. Examples of the fillers which are frequently added to the composition for the purpose of reduction of cost, adjustment of viscosity and the like are calcium carbonate, silica, talc, mica, kaolin cray, sellaite, asbestos, perlite, baryte, silica sand, scaly graphite, dolomite lime stone, gypsum, aluminum fine powder and the like. The amount of the filler is generally in the range from 5 to 100 weight parts based on 100 weight parts of the epoxy resin component (A). Particularly when talc is added as the filler, addition of up to 20 weight parts causes little decrease of the adhesive strengths of various kinds.

Examples of the pigments are titanium dioxide, litharge, lithopone, zinc oxide, carbon black and the like. Examples of the thixotropic agents are silicic acid (colloidal silica) agents such as silicic acid anhydride, silicic acid hydrate and the like, organic agents such as organic bentnite and the like. The amount of the thixotropic agent is generally in the range from 1 to 15 weight parts based on 100 weight parts of the epoxy resin component (A).

The epoxy resin adhesive composition of the invention can be prepared by mixing the component (A), the component (B), the component (C) and other components utilized according to necessity homogeneously at the room temperature. A mixing apparatus, such as a change can mixer, a planetary mixer, high speed stirring mixer, Henshel mixer, kneader, ink roll, extruder and the like, are utilized for this purpose.

The epoxy resin adhesive composition of the invention thus prepared has a remarkably improved impact shear resistance and the semi-gelling property simultaneously when it is compared with an adhesive composition which does not comprise the epoxy resin component (A) and the component (B) which is the powder core/shell polymer comprising an acrylate polymer or a methacrylate polymer.

When the epoxy resin adhesive composition is utilized as an adhesive material, substrate materials are bonded together with a layer of the epoxy resin adhesive composition inserted between the materials to be bonded.

For inserting a layer of the epoxy resin adhesive composition between the materials to be bonded, the conventional methods, such as casting into the space between the materials to be bonded, coating on the surface of the material to be bonded and the like other methods, may be utilized.

The epoxy resin adhesive composition can be coated on a material for coating by conventional methods, such as coating by spraying, coating by a sealer gun, coating with a brush and the like. The material for coating is generally a metal but other inorganic and organic materials may be utilized so long as the materials are not deformed or degenerated by heating at 140° C. When a metal is utilized, the application of the adhesive composition of the invention is not disturbed by the presence of anticorrosion oils on the surface of the substrate of this kind.

The epoxy resin adhesive composition can be utilized as a coating material, a sealing material, a foamed article and the like as well as the adhesive material. It is particularly advantageously utilized when the application occasionally requires storage or standing of the material for one month to one year at the room temperature before the material is cured by heating for the purpose of adhesion or sealing.

The ion-crosslinked resin powder utilized as the component (B) can be provided with new functions by forming composites with themoplastic polymers of various kinds, lower molecular weight derivatives of these polymers, unvulcanized rubbers, precursors of various kinds of thermosetting polymers and the like other materials.

DESCRIPTION OF THE PREFERRED EMBODIMENTS

The invention will be understood more readily with reference to the following examples; however, these examples are intended to illustrate the invention and are not to be construed to limit the scope of the invention.

Properties of the adhesive composition were evaluated by the following methods.

(1) Viscosity

Viscosities of the composition immediately after the preparation and after standing at 40° C. for 14 and 28 days were measured by a Brookfield-H type viscometer. The value of the viscosity after 14 and 28 days divided by the viscosity immediately after the preparation is shown as a aging coefficient.

(2) Impact shear strength, tensile shear strength and T-peel strength

Impact shear strength and tensile shear strength were measured according to the methods of Japanese Industrial Standard K-6855 and K-6850, respectively. The composition was applied to an untreated piece of cold rolled steel plate and cured at 180° C. for 30 minutes to prepare the sample.

T-peel strength was measured according to the method of Japanese Industrial Standard K-6854. A test piece of 0.8×25×200 mm was prepared by the same condition as described above.

(3) Semi-gelling property

A sample applied to the steel plate was heated at 110° C. for 5 minutes for gelation. The sample was then peeled from the substrate and visually evaluated according to the following criteria.

◯: the adhesive composition gel was easily peeled.

Δ: the adhesive composition gel had low strength and was broken during the peeling.

×: the semi-gelling did not take place after 5 minutes at 110° C.

(4) Storage stability

Ratio of the viscosity after storage at 40° C. for 7 days to the initial viscosity was measured and the storage stability was evaluated by using the ratio according to the following criteria.

◯: the ratio is 1.5 or smaller.

Δ: the ratio is larger than 1.5 and 5 or smaller.

×: the ratio is larger than 5.

EXAMPLE OF PREPARATION OF THE POWDER CORE/SHELL POLYMER

Monomers and crosslinking monomers for the core components listed in Table 1 were polymerized to prepare core particles having the specified glass transition temperature and the specified weight average diameter. Shell components listed in Table 1 were then graft polymerized on the core to form the shell having the specified glass transition temperature. Thus, powder polymers having the core-shell structure B-1 to B-10 were prepared.

EXAMPLE 1

To 100 weight parts of a bisphenol A type epoxy resin (Epikote #828 ®, a product of Yuka Shell Epoxy Co., Ltd.), 50 weight parts of the core/shell polymer B-1 shown in Table 1, and 8 weight parts of dicyandiamide were added. The mixture was mixed in a planetary mixer for 5 minutes and defoamed by a vacuum defoamer to prepare an epoxy resin adhesive composition. The semi-gelling property and the storage stability of the prepared composition were evaluated.

The adhesive composition prepared above was applied to the specified steel plate with a doctor knife and heat treated to prepare a sample. The adhesive strengths of the sample was measured and results are shown in Table 2.

EXAMPLE 2

An adhesive composition was prepared and evaluated by the same method as in Example 1 except that another powder core/shell polymer, B-2, was used in place of the polymer B-1. Results are shown in Table 2.

EXAMPLE 3

An adhesive composition was prepared and evaluated by the same method as in Example 1 except that another powder core/shell polymer, B-3, was used in place of the polymer B-1. Results are shown in Table 2.

EXAMPLE 4

An adhesive composition was prepared and evaluated by the same method as in Example 1 except that another powder core/shell polymer, B-4, was used in place of the polymer B-1. Results are shown in Table 2.

COMPARATIVE EXAMPLE 1

An adhesive composition was prepared and evaluated by the same method as in Example 1 except that another powder core/shell polymer, B-5, was used in place of the polymer B-1. Results are shown in Table 2.

The core component of the powder core/shell polymer used here had a high glass transition temperature of 25° C. Thus, the impact shear strength and the T-peel strength were decreased, showing no effect of the core/shell polymer.

COMPARATIVE EXAMPLE 2

An adhesive composition was prepared and evaluated by the same method as in Example 1 except that another powder core/shell polymer, B-7, was used in place of the polymer B-1. Results are shown in Table 2.

The core/shell polymer B-7 had a large average diameter of 12 μm. Thus, the impact shear strength and the T-peel strength were not sufficiently improved and the tensile shear strength was low.

COMPARATIVE EXAMPLE 3

An adhesive composition was prepared and evaluated by the same method as in Example 1 except that no powder core/shell polymer was used. Results are shown in Table 2.

The composition had very low T-peel strength and showed no semi-gelling property.

COMPARATIVE EXAMPLE 4

An adhesive composition was prepared and evaluated by the same method as in Example 1 except that a liquid acrylonitrile-butadiene rubber modified with terminal carboxyl groups was used in place of the polymer B-1. Results are shown in Table 2.

The composition had inferior impact shear strength and T-peel strength to those of the composition of Example 1 even though the strengths were improved by the addition of the liquid polymer. The composition showed no semi-gelling property.

COMPARATIVE EXAMPLE 5

An adhesive composition was prepared and evaluated by the same method as in Example 1 except that another powder core/shell polymer, B-6, was used in place of the polymer B-1. Results are shown in Table 2.

The core/shell polymer used here did not comprise a crosslinking monomer for the formation of the shell. The composition had good adhesive strengths, inferior semi-gelling property and inferior storage stability to a great degree.

COMPARATIVE EXAMPLE 6

An adhesive composition was prepared and evaluated by the same method as in Example 1 except that another powder core/shell polymer, B-8, was used in place of the polymer B-1. Results are shown in Table 2.

The shell component of the core/shell polymer used here had a low glass transition temperature of 25° C. The tensile shear strength, the semi-gelling property and the storage stability of the composition were all inferior.

COMPARATIVE EXAMPLE 7

An adhesive composition was prepared and evaluated by the same method as in Example 1 except that another powder core/shell polymer, B-9, was used in place of the polymer B-1. Results are shown in Table 2.

The core/shell polymer used here had a high content of the core of 91 weight %. The adhesive strengths, the semi-gelling property and the storage stability of the composition were all inferior.

COMPARATIVE EXAMPLE 8

An adhesive composition was prepared and evaluated by the same method as in Example 1 except that another powder core/shell polymer, B-10, was used in place of the polymer B-1. Results are shown in Table 2.

The core/shell polymer had a low content of the core of 17 weight %. The adhesive strengths of the composition were barely improved even though the semi-gelling property and the storage stability were good.

TABLE 1

| | (Part 1) | | | | |
|---|---|---|---|---|---|
| core/shell polymer[1] | B-1 | B-2 | B-3 | B-4 | B-5 |
| composition of the material (weight parts) | | | | | |

TABLE 1-continued

| core monomer | | | | | |
|---|---|---|---|---|---|
| butyl acrylate | 100 | 60 | 200 | — | 50 |
| methyl methacrylate | — | — | — | — | 50 |
| 2-ethylhexyl acrylate | — | — | — | 100 | — |
| crosslinking monomer | | | | | |
| triallyl trimellitate | 1 | 0.6 | 2 | 1 | 1 |
| shell monomer | | | | | |
| methyl methacrylate | 200 | 240 | 100 | 200 | 200 |
| butyl acrylate | — | — | — | — | — |
| crosslinking monomer | | | | | |
| triallyl trimellitate | 2 | 2.4 | 1 | 2 | 2 |
| properties of the polymer | | | | | |
| glass transition temperature (°C.) | | | | | |
| core | −45 | −45 | −45 | −60 | 25 |
| shell | 105 | 105 | 105 | 105 | 105 |
| weight average diameter of particle (μm) | 0.5 | 0.5 | 0.5 | 0.5 | 0.5 |

| | (Part 2) | | | | |
|---|---|---|---|---|---|
| core/shell polymer[1] | B-6 | B-7 | B-8 | B-9 | B-10 |
| composition of the material (weight parts) | | | | | |
| core monomer | | | | | |
| butyl acrylate | 100 | 100 | 100 | 100 | 100 |
| methyl methacrylate | — | — | — | — | — |
| 2-ethylhexyl acrylate | — | — | — | — | — |
| crosslinking monomer | | | | | |
| triallyl trimellitate | 1 | 1 | 1 | 1 | 1 |
| shell monomer | | | | | |
| methyl methacrylate | 200 | 200 | 100 | 8 | 500 |
| butyl acrylate | — | — | 100 | — | — |
| crosslinking monomer | | | | | |
| triallyl trimellitate | — | 2 | 2 | 0.1 | 5 |
| properties of the polymer | | | | | |
| glass transition temperature (°C.) | | | | | |
| core | −45 | −45 | −45 | −45 | −45 |
| shell | 100 | 105 | 25 | 105 | 105 |
| weight average diameter of particle (μm) | 0.5 | 12 | 0.5 | 0.5 | 0.5 |

[1] Both of the core and the shell were formed by emulsion polymerization at 70° C. The latices prepared by the polymerization were spray dried in all cases.

of dicyandiamide were added. The mixture was mixed in a planetary mixer for 10 minutes and defoamed by a vacuum defoamer to prepare an epoxy resin adhesive composition. The semi-gelling property and the storage stability of the prepared composition were evaluated.

The adhesive composition prepared above was applied to the specified steel plate with a doctor knife and heat treated at 180° C. for 30 minutes to prepare a sample. The adhesive strengths of the sample were measured according to the methods of Japanese Industrial Standard as described above. Results in Table 2 show that all of the impact shear strength, the tensile shear strength and T-peel strength of the sample were high.

EXAMPLE 6

An adhesive composition was prepared and evaluated by the same method as in Example 5 except that a bisphenol A type epoxy resin comprising 6 mols of added propylene oxide was used in place of the bisphenol A type epoxy resin comprising 6 mols of added ethylene oxide. The composition thus prepared showed high adhesive strengths like the composition in Example 5.

EXAMPLE 7

An adhesive composition was prepared and evaluated by the same method as in Example 6 except that 20 weight parts of talc was added as a filler. The composition thus prepared showed improved storage stability though the initial viscosity increased.

EXAMPLE 8

An adhesive composition was prepared and evaluated by the same method as in Example 5 except that the polymer having the core shell structure B-2 was used in place of the polymer B-1 in Example 5. The polymer used in Example 5 had the core/shell weight ratio of 1/2 and the polymer used in the present example had

TABLE 2

| | (Part 1) Example | | | | (Part 2) Comparative Example | | | | | | | |
|---|---|---|---|---|---|---|---|---|---|---|---|---|
| | 1 | 2 | 3 | 4 | 1 | 2 | 3 | 4 | 5 | 6 | 7 | 8 |
| polymer having the core-shell structure | B-1 | B-2 | B-3 | B-4 | B-5 | B-7 | — | —[1] | B-6 | B-8 | B-9 | B-10 |
| composition of the material (weight parts) | | | | | | | | | | | | |
| polymer having the core-shell structure | 50 | 50 | 50 | 50 | 50 | 50 | — | 50[1] | 50 | 50 | 50 | 50 |
| bisphenol A type epoxy resin | 100 | 100 | 100 | 100 | 100 | 100 | 100 | 100 | 100 | 100 | 100 | 100 |
| hardener dicyandiamide | 8 | 8 | 8 | 8 | 8 | 8 | 8 | 8 | 8 | 8 | 8 | 8 |
| properties of the polymer | | | | | | | | | | | | |
| impact shear strength (kgfcm/cm²) | 20 | 18 | 16 | 21 | 10 | 13 | 10 | 17 | 20 | 16 | 12 | 11 |
| tensile shear strength (kgf/cm²) | 298 | 291 | 272 | 248 | 295 | 222 | 296 | 227 | 289 | 166 | 159 | 297 |
| T-peel strength (kgf/2.5 cm) | 18 | 15 | 15 | 18 | 5 | 9 | 2 | 10 | 17 | 11 | 8 | 4 |
| semi-gelling property | ○ | ○ | ○ | ○ | ○ | △ | X | X | △ | X | X | ○ |
| storage stability | | | | | | | | | | | | |
| 7 days | ○ | ○ | ○ | ○ | ○ | ○ | ○ | X | X | X | X | ○ |
| 28 days | △ | △ | △ | △ | △ | △ | △ | X | X | X | X | △ |

[1] An acrylonitrile-butadiene rubber modified with terminal carboxyl groups was used in place of the core/shell polymer.

EXAMPLE 5

To 40 weight parts of a bisphenol A type epoxy resin comprising 6 mols of added ethylene oxide and 60 weight parts of a bisphenol A type epoxy resin, 40 weight parts of the powder polymer having the core/shell structure B-1 shown in Table 1 and 10 weight parts the core/shell weight ratio of 1/4. The latter polymer produced the composition having apparently lower adhesive stengths, showing that the core/shell weight ratio of 1/4 is close to the practical limit of increasing the thickness of the shell. The composition in the present example had similar semi-gelling property and storage stability to the composition in Example 5.

EXAMPLE 9

An adhesive composition was prepared and evaluated by the same method as in Example 8 except that a bisphenol A type epoxy resin comprising 6 mols of added propylene oxide was used in place of the bisphenol A type epoxy resin comprising 6 mols of added ethylene oxide. The composition prepared here had approximately the same, but slightly higher, adhesive strengths than the composition of Example 8, showing that the epoxy resin added with ethylene oxide tends to give higher strengths than the epoxy resin added with propylene oxide. This finding is the same as the finding in Example 6. The epoxy resin added with ethylene oxide was used in Comparative examples for this reason. The composition of the present example had about the same semi-gelling property and storage stability as the composition in Example 5.

EXAMPLE 10

An adhesive composition was prepared and evaluated by the same method as in Example 5 except that the core/shell polymer B-3 was used in place of the core/shell polymer B-1 in Example 5. The weight ratio of the core to the shell in Example 5 was 1/2 while it was 2/1 in the present example. The adhesive strengths of the composition in the present example had the same as or higher than those of the composition in Example 5. The semi-gelling property was however slightly lower in the present example.

EXAMPLE 11

An adhesive composition was prepared and evaluated by the same method as in Example 5 except that the core/shell polymer B-4 was used in place of the core/shell polymer B-1 in Example 5. The core in Example 5 was made from butyl acrylate while it was made from 2-ethylhexyl acrylate, the same kind of monomer having a higher molecular weight, in the present example. The composition in the present example had the same adhesive strengths as the composition in Example 5.

COMPARATIVE EXAMPLE 9

In a planetary mixer, 100 weight parts of a bisphenol A type epoxy resin and 8 weight parts of dicyandiamide were mixed for 10 minutes and the mixture was defoamed in vacuum to prepare an adhesive composition. The adhesive composition was evaluated by the same methods as in Example 5. The composition made from the bisphenol A type epoxy resin alone had extremely low T-peel strength and no semi-gelling property.

COMPARATIVE EXAMPLE 10

An adhesive composition was prepared and evaluated by the same method as in Example 5 except that an acrylonitrile-butadiene rubber modified with terminal carboxyl groups which is commercially used as a modifier for structural adhesive materials was used in place of the core/shell polymer B-1 in Example 5. The composition prepared here had lower T-peel strength, no semi-gelling property and rather inferior storage stability.

COMPARATIVE EXAMPLE 11

An adhesive composition was prepared and evaluated by the same method as in Example 5 except that a polyamide resin which is commercially used as a modifier for structural adhesive materials was used in place of the core/shell polymer B-1 in Example 5. Adhesive strengths of the composition prepared here were rather high but lower than those of the composition in Example 5. The composition had no semi-gelling property.

COMPARATIVE EXAMPLE 12

An adhesive composition was prepared and evaluated by the same method as in Example 9 except that 40% of the bisphenol type epoxy resin in Example 9 was replaced by the bisphenol A type epoxy resin comprising added ethylene oxide. The composition had slightly higher impact shear strength and T-peel strength than the composition made by using the bisphenol A type epoxy resin alone. It was suggested that the partial replacement of the epoxy resin with the epoxy resin comprising added ethylene oxide to increase flexibility increased adhesive strengths. However, the composition had no semi-gelling property just like the composition in Comparative example 9 did not.

COMPARATIVE EXAMPLE 13

An adhesive composition was prepared and evaluated by the same method as in Example 5 except that the core/shell polymer B-5 was used in place of the polymer B-1 in Example 5. In the present comparative example, a half of butyl acrylate used for the polymer in the core in Example 5 was replaced by methyl methacrylate which was used for the polymer in the shell in Example 5. The composition prepared had a low T-peel strength to a great degree.

COMPARATIVE EXAMPLE 14

An adhesive composition was prepared and evaluated by the same method as in Example 5 except that the core/shell polymer B-6 was used in place of the polymer B-1 in Example 5.

In the present invention, compatibility of the epoxy resin and the powder core/shell polymer is adjusted by crosslinking the shell for the purpose of controlling the viscosity and the storage stability of the adhesive composition. Addition of the crosslinking monomer during the graft polymerization is essential as described the claims. The core/shell polymer in the present comparative example was prepared without adding a crosslinking monomer during the polymerization of the shell. The composition thus prepared had inferior storage stability even though it had relatively good adhesive strengths.

COMPARATIVE EXAMPLE 15

An adhesive composition was prepared and evaluated by the same method as in Example 5 except that the core/shell polymer B-7 was used in place of the polymer B-1 in Example 5. Though the constitutions of the polymers were the same in Comparative example 5 and in Comparative example 15, the core particles prepared by the emulsion polymerization and having the weight average diameter of 0.5 $\mu$m were used in the former example whereas the polymer particles prepared by the suspension polymerization and having the weight average diameter of 12 $\mu$m were used in the latter example. The adhesive composition in Comparative example 15 showed inferior impact shear strength and T-peel strength.

COMPARATIVE EXAMPLE 16

An adhesive composition was prepared and evaluated by the same method as in Example 5 except that the core/shell polymer B-8 was used in place of the polymer B-1 in Example 5. In the present comparative example, a half of methyl methacrylate used for the polymer in the shell in Example 5 was replaced by butyl acrylate. The composition prepared had decreased adhesive strengths and storage stability and no semi-gelling property.

COMPARATIVE EXAMPLE 17

An adhesive composition was prepared and evaluated by the same method as in Example 5 except that the core/shell polymer B-9 was used in place of the polymer B-1 in Example 5. In the present comparative example, the same kind of polymer as the polymer in Example 5 was used except that the weight ratio of the core to the shell was made 100/8 in place of 1/2 in Example 5, making the thickness of the shell thinner. The composition prepared had decreased adhesive strengths, inferior storage stability and no semi-gelling property.

COMPARATIVE EXAMPLE 18

An adhesive composition was prepared and evaluated by the same method as in Example 5 except that the core/shell polymer B-10 was used in place of the polymer B-1 in Example 5. In the present comparative example, the same kind of polymer as the polymer in Example 5 was used except that the weight ratio of the core to the shell was made 1/5 in place of 1/2 in Example 5. The composition prepared had decreased T-peel strength to a great degree.

TABLE 3

| | Example | | | | | | |
|---|---|---|---|---|---|---|---|
| | 5 | 6 | 7 | 8 | 9 | 10 | 11 |
| polymer having the core-shell structure | B-1 | B-1 | B-1 | B-2 | B-2 | B-3 | B-4 |
| composition of the material (weight parts) | | | | | | | |
| polymer having the core-shell structure | 40 | 40 | 40 | 40 | 40 | 40 | 40 |
| bisphenol A type epoxy resin comprising added EO[1] | 40 | — | — | 40 | — | 40 | 40 |
| bisphenol A type epoxy resin comprising added PO[2] | — | 40 | 40 | — | 40 | — | — |
| bisphenol A type epoxy resin | 60 | 60 | 60 | 60 | 60 | 60 | 60 |
| hardener dicyandiamide | 10 | 10 | 10 | 10 | 10 | 10 | 10 |
| talc as filler | — | — | 20 | — | — | — | — |
| properties of the polymer | | | | | | | |
| impact shear strength (kgf cm/cm$^2$) | 26 | 26 | 24 | 20 | 19 | 27 | 26 |
| tensile shear strength (kgf/cm$^2$) | 325 | 317 | 322 | 332 | 340 | 307 | 311 |
| T-peel strength (kgf/2.5 cm) | 32 | 29 | 28 | 18 | 16 | 33 | 30 |
| semi-gelling property | ○ | ○ | ○ | ○ | ○ | △ | ○ |
| storage stability | | | | | | | |
| 7 days | ○ | ○ | ○ | ○ | ○ | ○ | ○ |
| 28 days | △ | △ | △ | △ | △ | △ | △ |

[1] An epoxy resin prepared by reaction of epichlorohydrin and a bisphenol A having 3 mols of ethylene oxide added to each of the two hydroxyl groups. The mol ratio of the bisphenol A to epichlorohydrin was 2/1.
[2] An epoxy resin prepared by reaction of epichlorohydrin and a bisphenol A having 3 mols of propylene oxide added to each of the two hydroxyl groups. The mol ratio of the bisphenol A to epichlorohydrin was 2/1.

TABLE 4

| | Comparative Example | | | | | | | | | |
|---|---|---|---|---|---|---|---|---|---|---|
| | 9 | 10 | 11 | 12 | 13 | 14 | 15 | 16 | 17 | 18 |
| polymer having the core-shell structure | — | — | — | — | B-5 | B-6 | B-7 | B-8 | B-9 | B-10 |
| composition of the material (weight parts) | | | | | | | | | | |
| polymer having the core-shell structure | — | — | — | — | 40 | 40 | 40 | 40 | 40 | 40 |
| CTBN[1] | — | 40 | — | — | — | — | — | — | — | — |
| polyamide resin impact resistance modifier | — | — | 40 | — | — | — | — | — | — | — |
| bisphenol A type epoxy resin comprising added EO[2] | — | 40 | 40 | 40 | 40 | 40 | 40 | 40 | 40 | 40 |
| bisphenol A type epoxy resin | 100 | 60 | 60 | 60 | 60 | 60 | 60 | 60 | 60 | 60 |
| hardener dicyandiamide | 8 | 10 | 10 | 10 | 10 | 10 | 10 | 10 | 10 | 10 |
| properties of the polymer | | | | | | | | | | |
| impact shear strength (kgf cm/cm$^2$) | 10 | 20 | 24 | 14 | 15 | 25 | 19 | 15 | 13 | 17 |
| tensile shear strength (kgf/cm$^2$) | 277 | 251 | 315 | 270 | 310 | 295 | 248 | 204 | 220 | 302 |
| T-peel strength (kgf/2.5 cm) | 2 | 10 | 25 | 8 | 6 | 15 | 10 | 10 | 6 | 6 |
| semi-gelling property | X | X | X | X | ○ | ○ | ○ | X | X | ○ |
| storage stability | | | | | | | | | | |
| 7 days | ○ | △ | ○ | ○ | ○ | X | ○ | X | X | ○ |

TABLE 4-continued

| | Comparative Example | | | | | | | | | |
|---|---|---|---|---|---|---|---|---|---|---|
| | 9 | 10 | 11 | 12 | 13 | 14 | 15 | 16 | 17 | 18 |
| 28 days | Δ | X | Δ | Δ | Δ | X | ○ | X | X | Δ |

[1] An acrylonitrile-butadiene rubber modified with terminal carboxyl groups.
[2] An epoxy resin prepared by reaction of epichlorohydrin and a bisphenol A having 3 mols of ethylene oxide added to each of the two hydroxyl groups. The mol ratio of the bisphenol A to epichlorohydrin was 2/1.

EXAMPLE 12

To 150 weight parts of water, 47 weight parts of n-butyl acrylate, 1.0 weight parts of sodium alkylsulfate having 12 to 18 carbon atoms as the emulsifier and 0.1 weight parts of potassium persulfate catalyst were added and the mixture was polymerized in emulsion at 70° C. for 180 minutes under stirring to prepare polymer dispersion of the core particles comprising poly-n-butyl acrylate. Then, 47 weight parts of methyl methacrylate was added to the reaction mixture continuously during 180 minutes and the shell was formed on the surface of the core particles by the core/shell emulsion polymerization. When 50% of methyl methacrylate was added to the mixture, 5 weight parts of methacrylic acid and 1 weight part of tetraethyleneglycol dimethacrylate (TEGDMA) as the crosslinking agent were further added continuously to complete the copolymerization.

To the latex obtained after the polymerization, 2 weight parts of potassium hydroxide was added as 1 weight % aqueous solution at the room temperature and the mixture was kept stirring for 30 minutes. After spray drying of the mixture in hot air stream of 150° C., resin particles for dispersion was obtained.

An adhesive composition was prepared by mixing the resin particles prepared above, the bisphenol A type epoxy resin and dicyandiamide as the hardener in a ratio shown in Table 1 in a planetary mixer at the room temperature.

Properties of the composition were evaluated and results of the evaluation are shown in Table 5.

SUPPLEMENTARY EXAMPLE 1

Polymerization was made by the same method as in Example 12 and the polymer was dried and mixed with other components to prepare an adhesive composition by the same method as in Example 12 except that potassium hydroxide was not added to the copolymer latex. Properties of the composition were evaluated and results of the evaluation are shown in Table 5.

EXAMPLES 13 AND 14

Polymerization was made by the same method as in Example 12 and 2 weight parts of calcium acetate (Example 13) or 2 weight parts of zinc acetate (Example 14) was added as the divalent cation source to the prepared copolymer latex. Then, the polymer was dried and mixed with other components to prepare an adhesive composition by the same method as in Example 12. The divalent cation source was added as a 1 weight % aqueous solution in both examples. Properties of the compositions were evaluated and results of the evaluation are shown in Table 5.

SUPPLEMENTARY EXAMPLE 2

Polymerization was made by the same method as in Example 12 and 2 weight parts of aluminum hydroxide was added as the trivalent cation source the prepared copolymer latex. Then, the polymer was dried and mixed with other components to prepare an adhesive composition by the same method as in Example 12. The divalent cation source was added as a 1 weight % aqueous solution. Properties of the composition were evaluated and results of the evaluation are shown in Table 5.

SUPPLEMENTARY EXAMPLE 3

Polymerization was made by the same method as in Example 12 and 2 weight parts of ammonium hydroxide was added as the monovalent non-metal cation source to the prepared copolymer latex. Then, the polymer was dried and mixed with other components to prepare an adhesive composition by the same method as in Example 12. The cation source was added as a 1 weight % aqueous solution. Properties of the composition were evaluated and results of the evaluation are shown in Table 5.

SUPPLEMENTARY EXAMPLE 4

By using 1.0 weight part of sodium alkylsulfate having 12 to 18 carbon atoms, 49.5 weight parts of n-butyl acrylate was polymerized by the emulsion polymerization method in the same condition as in Example 12 to prepare a polymer emulsion of the core particles composed of poly-n-butyl acrylate. To the polymer emulsion, 49.5 weight parts of methyl methacrylate was added continuously during 180 minutes and the shell was formed on the surface of the core particles by the core/shell emulsion polymerization. When 50% of methyl methacrylate was added to the mixture, 1 weight part of TEGDMA was further added continuously to complete the copolymerization.

To the latex obtained after the polymerization, 2 weight parts of potassium hydroxide was added as 1 weight % aqueous solution at the room temperature and the mixture was kept stirring for 30 minutes. After spray drying of the mixture in hot air stream of 150° C., resin particles for dispersion was obtained.

An adhesive composition was prepared from the resin particles for dispersion by the same method as in Example 12. Properties of the composition were evaluated and results of the evaluation are shown in Table 5.

EXAMPLES 15 AND 16

The core was prepared by the polymerization by the same method as in Example 12. The polymerization was continued for preparation of the shell by the same method as in Example 12 except that, when the amount of added methyl methacrylate reached 50%, 5 weight parts of maleic acid (Example 15) or 5 weight parts of acrylic acid (Example 16) in place of 5 weight parts of methacrylic acid in Example 12 and 1 weight part of TEGDMA additionally were added continuously to the reaction mixture. Thus, two kinds of copolymer latices having carboxylic acid monomer units different from that in Example 12 were prepared.

To the copolymer latex thus prepared, 2 weight parts of potassium hydroxide was added as a 1 weight % aqueous solution at the room temperature and an adhesive composition was prepared after spray drying the product by the same method as in Example 12. Properties of the composition were evaluated and results of the evaluation are shown in Table 5.

COMPARATIVE EXAMPLE 19

An adhesive composition was prepared and evaluated by the same method as in Example 12 except that no crosslinking component was used. Results are shown in Table 5.

EXAMPLES 17 AND 18

The core was prepared by the polymerization by the same method as in Example 12. The polymerization was continued for preparation of the shell by the same method as in Example 12 except that, when the amount of added methyl methacrylate reached 50%, 1 weight part of triallyl trimellitate (Example 17) or 1 weight part of trimethylolpropane trimethacrylate (Example 18) was used in place of TEGDMA in Example 12. Thus, two kinds of copolymer latices having crosslinking monomer units different from that in Example 12 were prepared.

To the copolymer latex thus prepared, 2 weight parts of potassium hydroxide were added as a 1 weight % aqueous solution at the room temperature and an adhesive composition was prepared after spray drying the product by the same method as in Example 12. Properties of the composition were evaluated and results of the evaluation are shown in Table 5.

EXAMPLE 19

An adhesive composition was prepared and evaluated by the same method as in Example 12 except that 2-ethylhexyl acrylate was used for the preparation of the core in place of n-butyl acrylate in Example 12. Results are shown in Table 5.

COMPARATIVE EXAMPLES 20 AND 21

In Comparative Example 20, the process for the prepartation of the core in the method of Example 12 was omitted and the polymerization was started directly from the process for the preparation of the shell by using methyl methacrylate, methacrylic acid and TEGDMA. Polymerization was completed relatively easily but the product showed the lowest adhesive strengths as shown in Table 1.

In Comparative Example 21, the process for the preparation of the shell in the method of Example 12 was omitted. Copolymer latex was prepared from n-butyl acrylate, methacrylic acid and TEGDMA.

The addition of the cation source, the spray drying, the preparation of the adhesive composition and the evaluation of the adhesive composition were made by the same method as in Example 12. The product in Comparative Example 21 could not be spray dried easily and a mild condition was selected for drying. The composition in Comparative Example 21 did not have the semi-gelling property. Results of the evaluation are shown in Table 5.

COMPARATIVE EXAMPLE 22

An adhesive composition was prepared and evaluated by the same method as in Example 12 except that n-butyl methacrylate was used for the preparation of the shell in place of methyl methacrylate in Example 12. Results are shown in Table 5.

EXAMPLES 20 AND 21

Polymerization for the preparation of a powder core/shell polymer was made by the same method as in Example 12. A cation source was added to the prepared polymer latex and the polymer was spray dried by the same method as in Example 12. In the preparation of the adhesive composition, 30% of the bisphenol A type epoxy resin in Example 12 was replaced by an epoxy resin prepared by reaction of epichlorohydrin and a bisphenol A having 3 mols of added ethylene oxide to each of the two hydroxyl groups in a mol ratio of 2/1 (Example 20) or by an epoxy resin prepared by reaction of epichlorohydrin and a bisphenol A having 3 mols of added propylene oxide to each of the two hydroxyl groups in a mol ratio of 2/1 (Example 21). Properties of the composition were evaluated by the same method as in Example 12 and results of the evaluation are shown in Table 5.

EXAMPLES 22 TO 24

In these examples, effect of inorganic salts on exhibition of the properties of ionic crosslinking in epoxy resins by addition of a cation to the acrylic powder core/shell polymer was examined. An adhesive composition was prepared by the same method as in Example 1 except that 25 weight parts of a filler, which was talc in Example 22, calcium carbonate in Example 23 and silica in Example 24, was additionally used. Properties of the composition were evaluated and results of the evaluation are shown in Table 5.

COMPARATIVE EXAMPLES 23 AND 24

In these examples, weight ratio of the monomer for the core and the monomer for the shell was varied in the preparation of the acrylic powder core/shell polymer. The composition was prepared and evaluated by the same method as in Example 12 except that the weight ratio of the core to the shell was made 90/4 in Comparative Example 23 and 14/80 in Comparative Example 24 in place of 47/47 in Example 12. Properties of the composition were evaluated and results of the evaluation are shown in Table 5.

TABLE 5

| Example | 12 | | 13 | 14 | | | | 15 |
|---|---|---|---|---|---|---|---|---|
| Supplementary example | | 1 | | | 2 | 3 | 4 | |
| | | (Part 1) | | | | | | |
| composition of the material (weight parts) | | | | | | | | |
| resin particle for dispersion | | | | | | | | |
| core | | | | | | | | |
| monomer | | | | | | | | |
| n-butyl acrylate | 47 | 47 | 47 | 47 | 47 | 47 | 49.5 | 47 |
| 2-ethylhexyl acrylate | — | — | — | — | — | — | — | — |
| crosslinking agent | | | | | | | | |
| triallyl trimellitate | 0.5 | 0.5 | 0.5 | 0.5 | 0.5 | 0.5 | 0.5 | 0.5 |
| glass transition | −45 | −45 | −45 | −45 | −45 | −45 | −45 | −45 |

TABLE 5-continued

| | | | | | | | | |
|---|---|---|---|---|---|---|---|---|
| temperature (°C.) | | | | | | | | |
| shell | | | | | | | | |
| main monomer | | | | | | | | |
| n-butyl methacrylate | — | — | — | — | — | — | — | — |
| methyl methacrylate | 47 | 47 | 47 | 47 | 47 | 47 | 49.5 | 47 |
| monomer containing carboxylic group | | | | | | | | |
| methacrylic acid | 5 | 5 | 5 | 5 | 5 | 5 | — | — |
| maleic acid | — | — | — | — | — | — | — | 5 |
| acrylic acid | — | — | — | — | — | — | — | — |
| crosslinking agent | | | | | | | | |
| TEGDMA[1)] | 0.5 | 0.5 | 0.5 | 0.5 | 0.5 | 0.5 | 0.5 | 0.5 |
| triallyl trimellitate | — | — | — | — | — | — | — | — |
| TMPT[2)] | — | — | — | — | — | — | — | — |
| glass transition temperature (°C.) | 105 | 105 | 105 | 105 | 105 | 105 | 105 | 105 |
| cation source | | | | | | | | |
| potassium hydroxide | 2 | — | — | — | — | — | 2 | 2 |
| calcium acetate | — | — | 2 | — | — | — | — | — |
| zinc acetate | — | — | — | 2 | — | — | — | — |
| aluminum hydroxide | — | — | — | — | 2 | — | — | — |
| ammonium hydroxide | — | — | — | — | — | 2 | — | — |

(Part 2)

| | | | | | | | | |
|---|---|---|---|---|---|---|---|---|
| composition of the material (weight parts) | | | | | | | | |
| dispersion medium | | | | | | | | |
| bisphenol A type[2)] | 200 | 200 | 200 | 200 | 200 | 200 | 200 | 200 |
| bisphenol A type with EO | — | — | — | — | — | — | — | — |
| bisphenol A type with PO | — | — | — | — | — | — | — | — |
| other components | | | | | | | | |
| filler | | | | | | | | |
| talc | — | — | — | — | — | — | — | — |
| calcium carbonate | — | — | — | — | — | — | — | — |
| silica | — | — | — | — | — | — | — | — |
| hardener | | | | | | | | |
| dicyandiamide | 16 | 16 | 16 | 16 | 16 | 16 | 16 | 16 |
| properties | | | | | | | | |
| weight average diameter of particles (μm) | 0.5 | 0.5 | 0.5 | 0.5 | 0.5 | 0.5 | 0.5 | 0.5 |
| viscosity | | | | | | | | |
| initial viscosity (Pa · s) | 5310 | 3430 | 6870 | 7050 | 7060 | 3610 | 2440 | 5890 |
| after 14 days (Pa · s) | 5990 | 16900 | 7080 | 7190 | 7270 | 7690 | 21800 | 6600 |
| aging coefficient (after 14 days/initial) | 1.1 | 4.9 | 1.0 | 1.0 | 1.0 | 2.1 | 8.9 | 1.1 |
| after 28 days (Pa · s) | 6340 | 28100 | 7420 | 7600 | 7850 | 19100 | >10$^5$ | 7270 |
| aging coefficient (after 28 days/initial) | 1.2 | 8.2 | 1.1 | 1.1 | 1.1 | 5.3 | — | 1.2 |
| physical properties | | | | | | | | |
| peeling strength (kgf/25 mm) | 21.2 | 23.9 | 16.9 | 16.8 | 10.8 | 22.5 | 25.0 | 20.1 |
| shear strength (kgf/cm$^2$) | 290 | 240 | 300 | 310 | 300 | 250 | 260 | 280 |
| semi-gelling property | ◯ | ◯ | ◯ | ◯ | ◯ | ◯ | ◯ | ◯ |
| Example | 16 | | 17 | 18 | 19 | | | |
| Comparative example | | 19 | | | | 20 | 21 | 22 |

(Part 3)

| | | | | | | | | |
|---|---|---|---|---|---|---|---|---|
| composition of the material (weight parts) | | | | | | | | |
| resin particle for dispersion | | | | | | | | |
| core | | | | | | | | |
| monomer | | | | | | | | |
| n-butyl acrylate | 47 | 47.5 | 47 | 47 | — | — | 94 | 47 |
| 2-ethylhexyl acrylate | — | — | — | — | 47 | — | — | — |
| crosslinking agent | | | | | | | | |
| triallyl trimellitate | 0.5 | 0.5 | 0.5 | 0.5 | 0.5 | — | — | 0.5 |
| glass transition temperature (°C.) | −45 | −45 | −45 | −45 | −60 | — | −45 | −45 |
| shell | | | | | | | | |
| main monomer | | | | | | | | |
| n-butyl methacrylate | — | — | — | — | — | — | — | 47 |
| methyl methacrylate | 47 | 47.5 | 47 | 47 | 47 | 94 | — | — |
| monomer containing carboxylic group | | | | | | | | |
| methacrylic acid | — | 5 | 5 | 5 | 5 | 5 | 5 | 5 |
| maleic acid | — | — | — | — | — | — | — | — |
| acrylic acid | 5 | — | — | — | — | — | — | — |
| crosslinking agent | | | | | | | | |
| TEGDMA[1)] | 0.5 | — | — | — | 0.5 | 1 | 1 | 0.5 |
| triallyl trimellitate | — | — | 0.5 | — | — | — | — | — |

TABLE 5-continued (Part 4 continued from previous)

| | | | | | | | | |
|---|---|---|---|---|---|---|---|---|
| TMPT[2] | — | — | — | 1 | — | — | — | — |
| glass transition temperature (°C.) | 105 | 105 | 105 | 105 | 105 | 105 | −45 | 20 |
| cation source | | | | | | | | |
| potassium hydroxide | 2 | 2 | 2 | 2 | 2 | 2 | 2 | 2 |
| calcium acetate | — | — | — | — | — | — | — | — |
| zinc acetate | — | — | — | — | — | — | — | — |
| aluminum hydroxide | — | — | — | — | — | — | — | — |
| ammonium hydroxide | — | — | — | — | — | — | — | — |

(Part 4)

| | | | | | | | | |
|---|---|---|---|---|---|---|---|---|
| composition of the material (weight parts) | | | | | | | | |
| dispersion medium | | | | | | | | |
| bisphenol A type[2] | 200 | 200 | 200 | 200 | 200 | 200 | 200 | 200 |
| bisphenol A type with EO | — | — | — | — | — | — | — | — |
| bisphenol A type with PO | — | — | — | — | — | — | — | — |
| other components | | | | | | | | |
| filler | | | | | | | | |
| talc | — | — | — | — | — | — | — | — |
| calcium carbonate | — | — | — | — | — | — | — | — |
| silica | — | — | — | — | — | — | — | — |
| hardener | | | | | | | | |
| dicyandiamide | 16 | 16 | 16 | 16 | 16 | 16 | 16 | 16 |
| properties | | | | | | | | |
| weight average diameter of particles (μm) | 0.5 | 0.5 | 0.5 | 0.5 | 0.5 | 0.5 | 0.5 | 0.5 |
| viscosity | | | | | | | | |
| initial viscosity (Pa · s) | 5350 | 5410 | 5320 | 5440 | 5660 | 2330 | 9910 | 8140 |
| after 14 days (Pa · s) | 6010 | 9890 | 5960 | 6150 | 6340 | 2630 | 10200 | 9200 |
| aging coefficient (after 14 days/initial) | 1.1 | 1.8 | 1.1 | 1.1 | 1.1 | 1.1 | 1.1 | 1.1 |
| after 28 days (Pa · s) | 6600 | 13200 | 6250 | 6600 | 6740 | 2810 | 13200 | 11700 |
| aging coefficient (after 28 days/initial) | 1.2 | 2.4 | 1.2 | 1.2 | 1.2 | 1.2 | 1.3 | 1.4 |
| physical properties | | | | | | | | |
| peeling strength (kgf/25 mm) | 21.0 | 22.1 | 21.2 | 21.3 | 22.3 | 3.4 | 4.3 | 13.2 |
| shear strength (kgf/cm²) | 290 | 290 | 290 | 290 | 270 | 320 | 160 | 200 |
| semi-gelling property | ○ | ○ | ○ | ○ | ○ | ○ | X | Δ |
| Example | 20 | 21 | 22 | 23 | 24 | | | |
| Comparative example | | | | | | | 23 | 24 |

(Part 5)

| | | | | | | | |
|---|---|---|---|---|---|---|---|
| composition of the material (weight parts) | | | | | | | |
| resin particle for dispersion | | | | | | | |
| core | | | | | | | |
| monomer | | | | | | | |
| n-butyl acrylate | 47 | 47.5 | 47 | 47 | 47 | 90 | 14 |
| 2-ethylhexyl acrylate | — | — | — | — | — | — | — |
| crosslinking agent | | | | | | | |
| triallyl trimellitate | 0.5 | 0.5 | 0.5 | 0.5 | 0.5 | 0.9 | 0.2 |
| glass transition temperature (°C.) | −45 | −45 | −45 | −45 | −45 | −45 | −45 |
| shell | | | | | | | |
| main monomer | | | | | | | |
| n-butyl methacrylate | — | — | — | — | — | — | — |
| methyl methacrylate | 47 | 47 | 47 | 47 | 47 | 4 | 80 |
| monomer containing carboxylic group | | | | | | | |
| methacrylic acid | 5 | 5 | 5 | 5 | 5 | 5 | 5 |
| maleic acid | — | — | — | — | — | — | — |
| acrylic acid | — | — | — | — | — | — | — |
| crosslinking agent | | | | | | | |
| TEGDMA[1] | 0.5 | 0.5 | 0.5 | 0.5 | 0.5 | 0.05 | 0.8 |
| triallyl trimellitate | — | — | — | — | — | — | — |
| TMPT[2] | — | — | — | — | — | — | — |
| glass transition temperature (°C.) | 105 | 105 | 105 | 105 | 105 | 105 | 105 |
| cation source | | | | | | | |
| potassium hydroxide | 2 | 2 | 2 | 2 | 2 | 2 | 2 |
| calcium acetate | — | — | — | — | — | — | — |
| zinc acetate | — | — | — | — | — | — | — |
| aluminum hydroxide | — | — | — | — | — | — | — |
| ammonium hydroxide | — | — | — | — | — | — | — |

(Part 6)

| | | | | | | | |
|---|---|---|---|---|---|---|---|
| composition of the material (weight parts) | | | | | | | |
| dispersion medium | | | | | | | |
| bisphenol A type[2] | 140 | 140 | 200 | 200 | 200 | 200 | 200 |

TABLE 5-continued

|  | | | | | | | |
|---|---|---|---|---|---|---|---|
| bisphenol A type with EO | 60 | — | — | — | — | — | — |
| bisphenol A type with PO | — | 60 | — | — | — | — | — |
| other components | | | | | | | |
| filler | | | | | | | |
| talc | — | — | 25 | — | — | — | — |
| calcium carbonate | — | — | — | 25 | — | — | — |
| silica | — | — | — | — | 25 | — | — |
| hardener | | | | | | | |
| dicyandiamide | 16 | 16 | 16 | 16 | 16 | 16 | 16 |
| properties | | | | | | | |
| weight average diameter of particles (μm) | 0.5 | 0.5 | 0.5 | 0.5 | 0.5 | 0.5 | 0.5 |
| viscosity | | | | | | | |
| initial viscosity (Pa·s) | 1780 | 1750 | 11000 | 9880 | 11420 | 9060 | 3140 |
| after 14 days (Pa·s) | 2020 | 1960 | 12300 | 11200 | 12800 | 10200 | 3550 |
| aging coefficient (after 14 days/initial) | 1.1 | 1.1 | 1.1 | 1.1 | 1.1 | 1.1 | 1.1 |
| after 28 days (Pa·s) | 2150 | 2180 | 12600 | 11500 | 13100 | 12900 | 3780 |
| aging coefficient (after 28 days/initial) | 1.2 | 1.2 | 1.1 | 1.2 | 1.1 | 1.4 | 1.2 |
| physical properties | | | | | | | |
| peeling strength (kgf/25 mm) | 28.1 | 27.6 | 21.1 | 20.2 | 21.7 | 10.9 | 8.5 |
| shear strength (kgf/cm$^2$) | 340 | 340 | 320 | 330 | 320 | 220 | 350 |
| semi-gelling property | ○ | ○ | ○ | ○ | ○ | X | ○ |

[1]TEGDMA: tetramethyleneglycol dimethacrylate
[2]TMPT: trimethylolpropane trimethacrylate
[3]Epicoat 828 ®, a product of Yuka Shell Epoxy Co., Ltd.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, the epoxy resin adhesive composition of the invention comprises the acrylate powder core/shell polymer as the modifier for improving impact resistance and has excellent adhesive properties such as impact resistance, tensile shear strength and T-peel strength as well as excellent semi-gelling property. The epoxy resin adhesive composition of the invention in which the particles of resin powder of an acrylate polymer or a methacrylate polymer crosslinked with ion are dispersed in the uncured epoxy resin medium has not only excellent semi-gelling property and mechanical properties of cured products but also excellent storage stability for a long time and it is particularly advantageously utilized when the application occasionally requires storage or standing of the material for one month to one year at the room temperature.

What is claimed is:

1. An epoxy resin adhesive composition comprising:
   (A) an epoxy resin,
   (B) 10 to 100 weight parts based on 100 weight parts of (A) of a powder core/shell polymer comprising particles having,
   a core comprising an acrylate polymer or a methacrylate polymer having a glass transition temperature of −30° C. or lower and 0.01 to 5 weight %, based on the total amount of the monomers, of a crosslinking monomer having two or more double bonds of substantially the same reactivity in the molecule and
   a shell comprising a copolymer having a glass transition temperature of 70° C. or higher which is made from (a) an acrylate monomer or a methacrylate monomer, (b) a radical polymerizable unsaturated carboxylic acid monomer having 3 to 8 carbon atoms and carboxyl groups, the amount of the monomer having carboxyl groups being 0.01 to 20 weight parts based on 100 weight parts of the shell copolymer, and (c) 0.01 to 5 weight %, based on the total weight of monomers in the shell, of a crosslinking monomer having two or more double bonds of substantially the same reactivity in the molecule,
   wherein the powder core/shell polymer comprises powder polymer particles ion-crosslinked by addition of a monovalent or divalent metal cation in a mole ratio of metal cation to the carboxyl groups in the copolymer of 0.1:1 to 3:1, and wherein the weight ratio of the core to the shell is from 10:1 to 1:4 and the weight average diameter of the core comprising a single particle or an aggregate of the particles is from 0.1 to 3.0 μm; and
   (C) 3 to 30 weight parts based on 100 weight parts of (A) of a heat activation type hardener for epoxy resins, 2. An epoxy resin adhesive composition as claimed in claim 1 wherein the epoxy resin is an epoxy resin derived by addition of 2 to 20 mols of ethylene oxide to bisphenol A, an epoxy resin derived by addition of 2 to 20 mols of propylene oxide to bisphenol A or a mixture thereof.

3. An epoxy resin adhesive composition as claimed in claim 1 wherein the weight average diameter of the core comprising a single particle or an aggregate of the particles is in the range from 0.15 to 2.0 μm.

4. An epoxy resin adhesive composition as claimed in claim 1 wherein the amount of (B) the powder core/shell polymer is in the range from 10 to 50 weight parts and the amount of (C) the heat activation type hardener for epoxy resins is in the range from 5 to 20 weight parts based on 100 weight parts of (A) the epoxy resin.

5. An epoxy resin adhesive as claimed in claim 1 wherein the core comprises an acrylate polymer or a methacrylate polymer having a glass transition temperature in the range from −40° to −70° C.

6. An epoxy resin adhesive composition as claimed in claim 1 wherein the shell comprises an acrylate polymer or a methacrylate polymer having a glass transition temperature in the range from 80° to 120° C.

7. An epoxy resin adhesive composition as claimed in claim 1 wherein the core is made by copolymerization of an acrylate monomer or a methacrylate monomer and 0.1 to 2 weight % of a crosslinking monomer based on the total amount of the monomer constituting the core.

8. An epoxy resin adhesive composition as claimed in claim 1 wherein the crosslinking monomer (C) for the shell is triallyl trimellitate.

9. The epoxy resin adhesive composition of claim 1 wherein the core comprises an acrylate polymer or methacrylate polymer having a glass transition temperature of −30° C. to −70° C.

10. The epoxy resin adhesive composition of claim 1 wherein the copolymer comprised in the shell has a glass transition temperature of 70° C. to 120° C. V

* * * * *